US008761975B2

(12) United States Patent
Watson

(10) Patent No.: US 8,761,975 B2
(45) Date of Patent: Jun. 24, 2014

(54) METHOD AND APPARATUS FOR REAL-TIME POLARS

(75) Inventor: Derek G. Watson, Portland, OR (US)

(73) Assignee: The Boeing Company, Chicago, IL (US)

(*) Notice: Subject to any disclaimer, the term of this patent is extended or adjusted under 35 U.S.C. 154(b) by 1089 days.

(21) Appl. No.: 11/752,487

(22) Filed: May 23, 2007

(65) Prior Publication Data
US 2008/0294308 A1    Nov. 27, 2008

(51) Int. Cl.
*G05D 1/00* (2006.01)

(52) U.S. Cl.
USPC ................................. 701/21; 701/23; 701/418

(58) Field of Classification Search
USPC ............. 701/21, 23, 200, 201, 204, 207, 300, 701/400, 408, 409, 410, 411, 412, 415, 418, 701/423, 425, 470, 479; 703/8; 114/140; 342/191, 450, 451, 452
See application file for complete search history.

(56) References Cited

U.S. PATENT DOCUMENTS

| | | | | |
|---|---|---|---|---|
| 3,814,910 A | * | 6/1974 | Palmieri et al. | 701/21 |
| 3,875,388 A | * | 4/1975 | Luten et al. | 701/21 |
| 3,881,095 A | * | 4/1975 | Taylor et al. | 701/21 |
| 4,040,374 A | * | 8/1977 | Greene | 114/144 C |
| 4,446,729 A | * | 5/1984 | Watson, III | 73/178 R |
| 4,533,918 A | * | 8/1985 | Virnot | 342/451 |
| 4,785,404 A | * | 11/1988 | Sims et al. | 701/200 |
| 4,843,575 A | * | 6/1989 | Crane | 701/99 |
| 5,152,239 A | * | 10/1992 | Hossfield et al. | 114/144 E |
| 5,191,341 A | * | 3/1993 | Gouard et al. | 342/456 |
| 6,308,649 B1 | * | 10/2001 | Gedeon | 114/39.11 |
| 6,376,831 B1 | * | 4/2002 | Nguyen | 250/227.21 |
| 7,890,225 B2 | * | 2/2011 | Lopriore | 701/21 |
| 8,135,504 B2 | * | 3/2012 | Summers | 701/21 |
| 2006/0064242 A1 | * | 3/2006 | Litvack et al. | 701/202 |
| 2008/0147257 A1 | * | 6/2008 | Kuhlgatz et al. | 701/21 |
| 2008/0183449 A1 | * | 7/2008 | Grichnik et al. | 703/8 |
| 2009/0012773 A1 | * | 1/2009 | Glass et al. | 703/21 |

FOREIGN PATENT DOCUMENTS

| | | |
|---|---|---|
| GB | 1353854 A | 5/1974 |
| GB | 2171208 A * | 8/1986 |
| GB | 2171208 A1 | 8/1986 |

OTHER PUBLICATIONS

W.H Warden; "A control system model for autonomous sailboat navigation," in IEEE Proceedings of Southeastcon, vol. 2, pp. 944-947, School of Industry and System Engineering, Georgia Inst. of Technol., Atlanta, 1991.*
Abril et al; "Fuzzy Control of a Sailboat," International Journal of Approximate Reasoning, vol. 16, pp. 359-375, 1997.*
W. H. Warden; "A control system model for autonomous sailboat navigation," in IEEE Proceedings of Southeastcon, vol. 2, pp. 944-947, School of Industry and System Engineering, Georgia Inst. of Technol., Atlanta, 1991.*

* cited by examiner

*Primary Examiner* — Stephen Holwerda
(74) *Attorney, Agent, or Firm* — Yee & Associates, P.C.

(57) ABSTRACT

A computer implemented method, apparatus, and computer program product for real-time creation of vessel performance models. Performance inputs are received from a set of sensors during a voyage of a vessel. The performance inputs are data associated with a performance of the vessel during the voyage. A real-time performance model is generated during the voyage using a subset of the performance inputs. A predicted value for velocity made good is identified for the vessel using the real-time performance model.

16 Claims, 4 Drawing Sheets

METHOD AND APPARATUS FOR REAL-TIME POLARS

BACKGROUND INFORMATION

1. Field

The present application is related generally to a data processing system and in particular to a method and apparatus for real-time polars. More particularly, the present application is directed to a computer implemented method, apparatus, and computer usable program code for providing real-time performance models for vessels.

2. Background

A ship polar or sailing polar is a model of a vessel's theoretical performance. Performance in this context is defined as a vessel's progress into the wind, also referred to as velocity made good (VMG), given the angle of the wind in relation to the bow of the vessel. The ship polar, also referred to as a performance model, provides predictions of a ship's speed based on weather conditions and ship heading.

Generally, users have to purchase files of sailing polars or manually create sailing polars from pre-recorded data. Polars are sometimes generated using U.S. Sailing's Velocity Prediction Program (VPP). The Velocity Prediction Program creates sailing polars based on vessel characteristics, such as hydrostatic analysis, stability analysis, body plan outlines, and lines processing. The results generated using these pre-generated, static polars do not generate results based on the actual performance of a particular vessel for which the polar is being used. This approach may be referred to as an off-line approach.

Another current solution is to produce polar diagrams based on wind speed, wind angle, and velocity made good. Those recordings are processed off-line using least mean squares fit. Polars may also be created manually by plotting velocity made good, true wind angle, and apparent wind angle values using currently available applications for creating polars. However, manually plotting polars may be unduly burdensome and inconvenient for a user.

Off-line techniques for creating polars use data regarding a particular vessel's expected or typical characteristics and recordings of weather conditions versus the expected performance for that type of vessel under the given set of weather conditions to pre-generate polars in an off-line or static approach. Sailing polars created using current solutions do not enable polars to account for real-time changes in a particular vessel's performance during an actual voyage. Thus, sailing polars, whether purchased by a user or manually created by the user, typically provide only a crude model of a ship's performance due to real-world variations in vessels, wear and tear, and other factors that may affect the performance of a particular vessel.

SUMMARY

The illustrative embodiments provide a computer implemented method, apparatus, and computer usable program code for real-time creation of vessel performance models. In one embodiment, performance inputs are received from a set of sensors during a voyage of a vessel. The performance inputs are data associated with a performance of the vessel during the voyage. A real-time performance model is generated during the voyage using a subset of the performance inputs. A predicted value for velocity made good is identified for the vessel using the real-time performance model.

In another embodiment, an apparatus is provided. The apparatus includes a bus system; a communications system connected to the bus system; a memory connected to the bus system, wherein the memory includes computer usable program code; and a processing unit connected to the bus system. The processing unit executes the computer usable program code to receive performance inputs from a set of sensors during a voyage of a vessel; generate a real-time sailing polar during the voyage using a subset of the performance inputs; and identify a predicted value for velocity made good for the vessel using the real-time sailing polar. The performance inputs are data associated with a performance of the vessel during the voyage.

In one embodiment, a system for generating real-time performance models is provided. The system includes a set of sensors for capturing real-time performance input data. The real-time performance input data is data associated with the performance of a vessel during a current voyage of the vessel. The system also provides a real-time performance modeler, wherein the real-time performance modeler dynamically generates a predicted performance value for the vessel during the voyage of the vessel using the performance input data. The predicted performance value is a predicted value for velocity made good for the vessel.

In another illustrative embodiment, a computer program product has a computer usable medium that includes computer usable program code for real-time creation of vessel performance models. The computer program product includes computer usable program code for receiving performance inputs from a set of sensors during a voyage of a vessel, wherein the performance inputs are data associated with a performance of the vessel during the voyage. The computer usable program code generates, during the voyage, a real-time performance model using a subset of the performance inputs. The computer usable program code identifies a predicted value for velocity made good for the vessel using the real-time performance model.

The features, functions, and advantages can be achieved independently in various embodiments of the disclosure or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
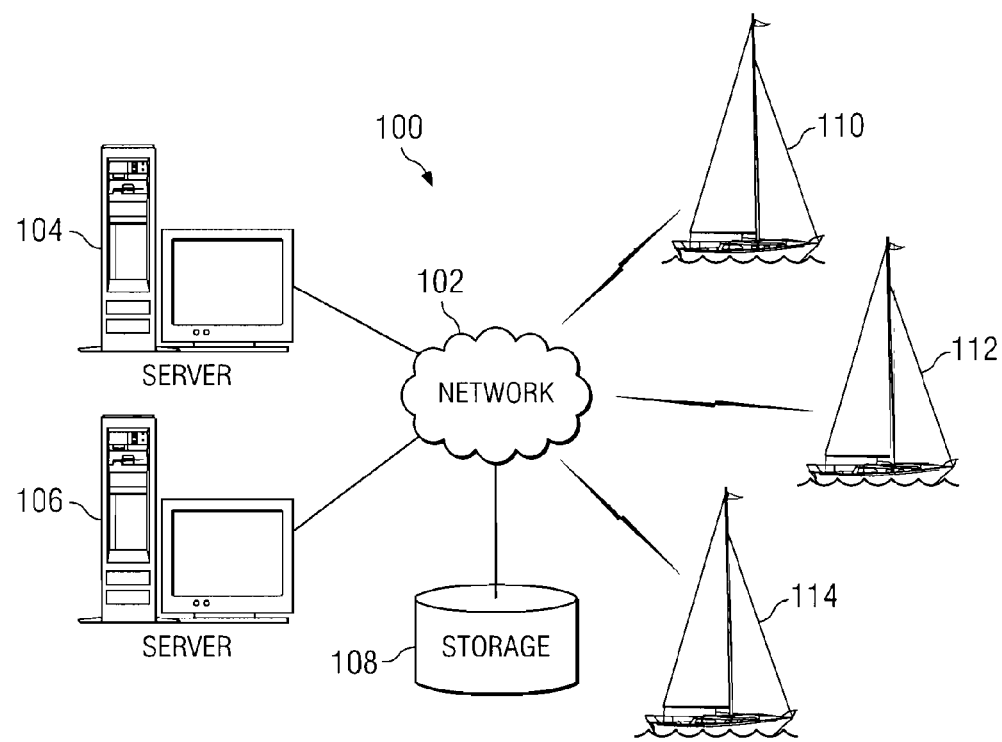
FIG. 1 is a pictorial representation of a network of data processing systems in which illustrative embodiments may be implemented.
Figure 2:
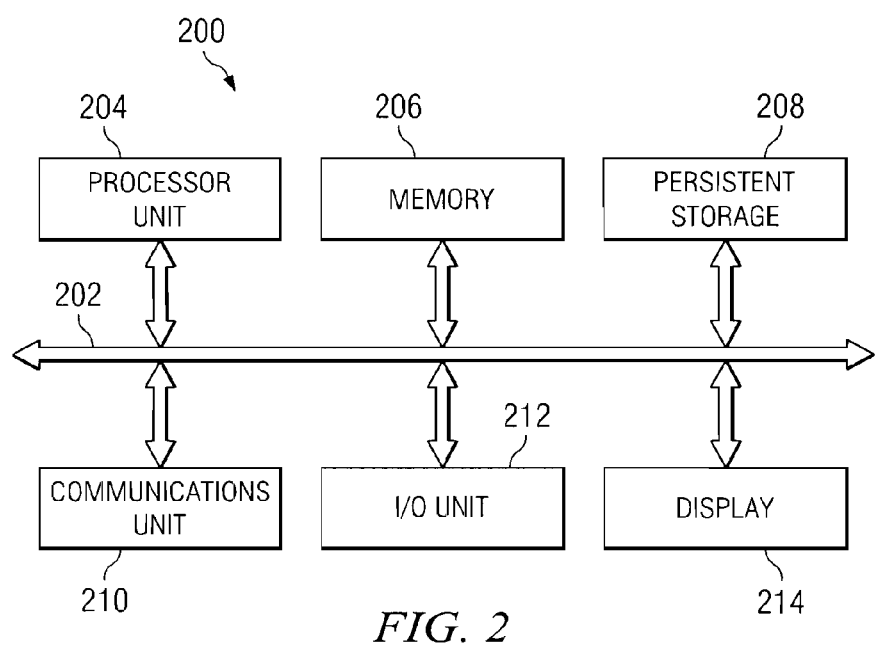
FIG. 2 is a block diagram of a data processing system in which advantageous embodiments may be implemented.

With reference now to the figures and in particular with reference to FIGS. 1-2, exemplary diagrams of environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 are clients located on or in association with a vessel. The vessel may be any type of vessel. As used herein, a vessel is any size vessel, ship, or craft designed to float on and/or provide transport over water. For example, a vessel may include, without limitation, a sailing ship, a yacht, a motor boat, a tanker, a cargo ship, a sail boat, a sloop, a container vessel, a cruise ship, an amphibious car, an ocean going vessel, or any other type of craft capable of travel over or through water.

Clients 110, 112, and 114 may be, for example and without limitation, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of numerous commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a data processing system is depicted in accordance with an advantageous embodiment. Data processing system 200 is an example of a data processing system that may be used to implement different processes for an advantageous embodiment in a processor unit.

Data processing system 200 may be used to implement different computers, such as, for example, computer 100 in FIG. 1. In this illustrative example, communications fabric 202 provides communications between processor unit 204, memory 206, persistent storage 208, communications unit 210, I/O unit 212, and display 214. Communications fabric 202 in these examples takes the form of a bus. Of course, communications fabric 202 may take any form that provides communications between the different components of data processing system 200.

Processor unit 204 executes instructions for software that may be loaded into memory 206. Processor unit 204 may be a set of one or more processors or may be a multi-processor core depending on the particular implementation. Memory 206, in these examples, may be, a random access memory. Persistent storage 208 may take various forms depending on the particular implementation. For example, persistent storage 208 may be, without limitation, a hard drive, a flash memory, a rewritable optical disk, a rewritable magnetic tape, or some combination of the above.

Communications unit 210, in these examples, provides for communications with other data processing systems or devices. In these examples, communications unit 210 may be, without limitation, a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system, the object-oriented programming system, and applications or programs are located on persistent storage 208. These instructions may be loaded into memory 206 for execution by processor unit 204. The processes of the illustrative embodiments may be performed by processor unit 204 using computer implemented instructions, which may be located in a memory, such as memory 206.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA. Data processing system 200 may also be an embedded computer system. An embedded computer system is a computing device that is connected through an external port or other interface with another computing device. The other computing device may be local or remote. In such a case, performance predictions may be sent out in response to external requests from other local devices connected to I/O unit 212 or communications unit 210. An external device may include a sailing polar generator, a sailing polar renderer, an estimated time of arrival calculator, or a shortest path component.

Pre-predicted ship polars are created in an off-line fashion based on the expected performance for a given vessel rather than the actual, real-time performance for the given vessel. The data in a polar is typically presented to a user as a table of measured weather data and predicted vessel performance data. For example, a polar generally includes true wind velocity (VTW), true wind angle (TWA), apparent wind velocity (VAW), apparent wind angle (AWA), boat or vessel velocity (V), and velocity made good toward the wind (VMG) values. Apparent wind angle is the relative wind angle as perceived by an observer or instrument associated with the vessel. The true wind angle is the angle of the wind perceived by an observer that is stationary. If the vessel is moving, the apparent wind angle felt by the moving observer may be different than the actual wind angle.

Based on the inputs of true wind velocity, true wind angle, apparent wind velocity, and apparent wind angle, the values for vessel velocity (V) and velocity made good (VMG) can be calculated using the polar.

The illustrative embodiments recognize that pre-predicted ship polars generated by an off-line approach may be inaccurate due to differences in individual vessels. Moreover, polars created using an off-line approach can become increasingly out of date due to changes in a vessel's performance over the course of one or more voyages from wear and tear on the vessel, stretching in the sails, damage to the vessel, changes in the vessel's equipment, and/or changes in the vessel's weight/mass from consumption of fuel and ship's stores. Polars created using current solutions do not enable polars to account for these and other real-time changes in a particular vessel's performance during an actual voyage.

Therefore, the illustrative embodiments recognize a need for the creation of polars in real-time, during the course of a vessel's voyage. The term voyage refers to any amount of distance a vessel sails, moves, or travels on or over water for any amount of time. As a vessel is sailing or traveling, weather condition parameters and vessel performance parameters may be taken in real-time during the course of the voyage of a particular vessel. The polars for that particular vessel are then created dynamically based on the real-time data for that particular vessel.

The illustrative embodiments provide a computer implemented method, apparatus, and computer usable program code for real-time creation of vessel performance models. In one embodiment, the process performance inputs are received from a set of sensors during a voyage of a vessel. The performance inputs are data associated with a performance of the vessel during the voyage. A real-time performance model is generated during the voyage using a subset of the performance inputs. A predicted value for velocity made good is identified for the vessel using the real-time performance model.

In response to a determination that a pre-existing performance model for the vessel is available, the pre-existing performance model is updated using the subset of the performance inputs to form an updated performance model. The subset of the performance inputs may include all of the performance inputs or any part or portion of the performance inputs, or interpolated values derived from one or more performance inputs.

A predicted vessel speed (VMG) value may be identified for the vessel using the real-time performance prediction generated by the real-time performance model. A predicted value for leeway may also be identified for the vessel using the performance prediction generated by the real-time performance model.

Figure 3:
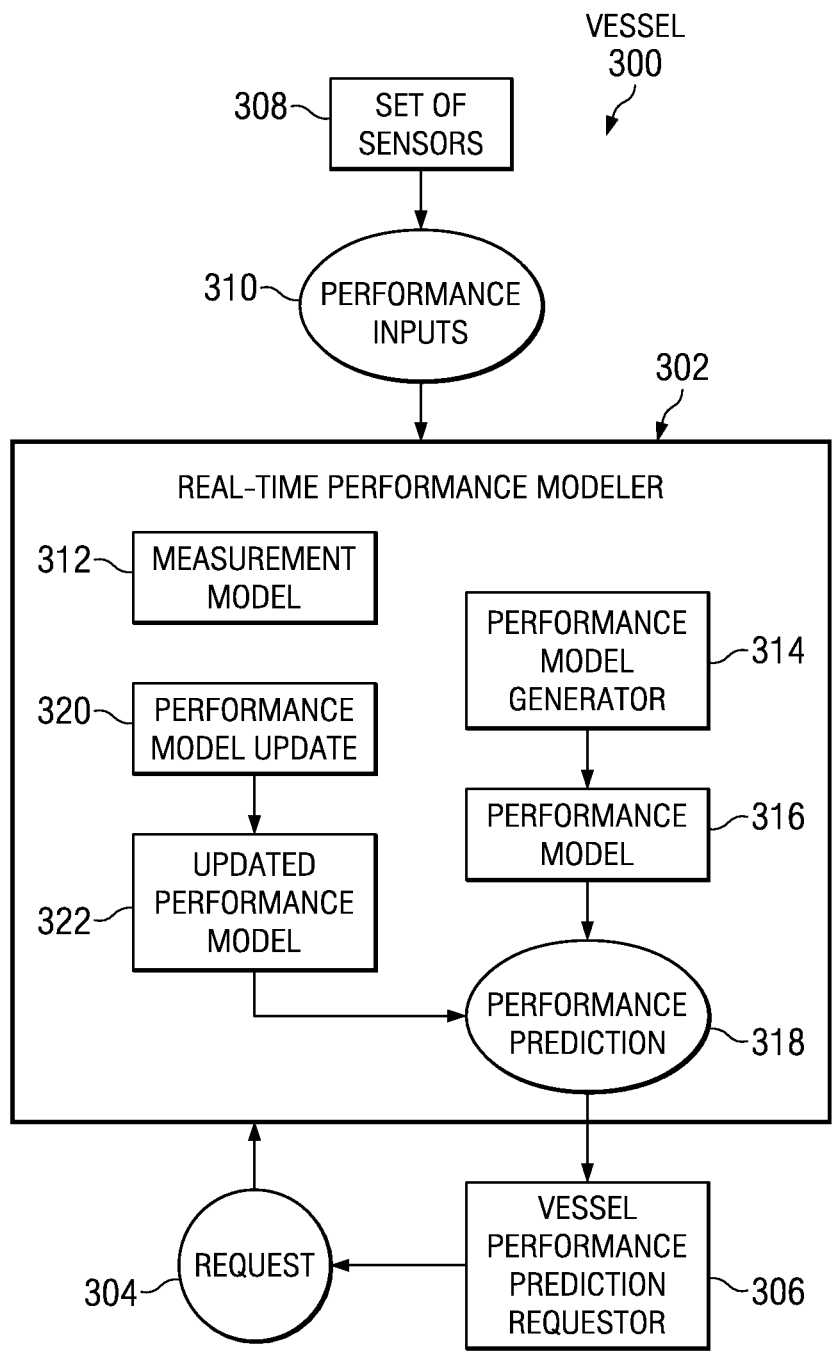
FIG. 3 is a block diagram illustrating a dataflow through a data processing system when real-time performance predictions are generated for a vessel in accordance with an advantageous embodiment.

FIG. 3 is a block diagram illustrating a dataflow through a data processing system when real-time performance predictions are generated for a vessel in accordance with an advantageous embodiment. Vessel 300 is any type of known or available vessel for traveling on or over water. Vessel 300 includes a data processing system, such as data processing system data processing system 200 in FIG. 2. The data processing system includes real-time performance modeler 302.

Real-time performance modeler 302 is a software component for generating and/or updating performance models for vessel 300. Real-time performance modeler 302 is associated with vessel 300. In this example, real-time performance modeler 302 is located on vessel 300.

Real-time performance modeler 302 receives request 304 for a polar and/or other performance prediction data for vessel 300 from vessel performance prediction requester 306. Vessel performance prediction requester 306 may be a user, an application, such as a weather router, a vessel simulator, a sailing polar display, a polar diagram renderer, or another computer. A polar diagram renderer is a software component for generating a polar diagram, such as the polar diagram shown in FIG. 6. A weather router is a software component for generating a route or navigational plan intended to avoid troubled waters, increase the speed at which vessel 300 reaches an intended destination, or decrease the amount of fuel required to reach the intended destination. A weather router can predict a shortest route for reaching a destination. A sailing polar display is a component for generating and displaying a real-time sailing polar. A vessel simulator creates simulated/predicted physical vessel behavior based on simulated inputs such as environmental conditions, and heading. A vessel simulator can be used to simulate sensory inputs, such as for testing vessel navigation software or for testing the quality of the performance modeler.

Real-time performance modeler 302 receives real-time sensory inputs from set of sensors 308. Set of sensors 308 is a set of one or more sensors for measuring weather conditions, such as without limitation, wind speed and wind angle. Set of sensors 308 also gather data associated with the vessel 300's performance, such as, but not limited to, velocity made good. Set of sensors 308 include any known or available hardware and/or software devices for measuring performance of vessel 300, wind speed, wind angle, wind direction, boat speed, course, heading, and/or other performance data and weather data. For example, set of sensors 308 may include, but is not limited to, navigation instruments, tank level sensors, global positioning system (GPS) receivers, depth finders, and devices for measuring wind speed and wind direction.

Set of sensors 308 may include one or more sensors located on or associated with vessel 300 itself. In addition, set of sensors 308 may include one or more sensors that are located remotely to vessel 300. For example, a sensor may be located on a buoy, on another vessel, on a satellite, or on land. If a sensor is located remotely to vessel 300, the data gathered by the sensor may be transmitted to real-time performance modeler 302 using any known or available hardware and/or software for transmitting data over distances, such as, without limitation, a wireless network connection.

In one embodiment, set of sensors 308 includes National Marine Electronics Association (NMEA) 0183 and/or NMEA 2000. NMEA 0183 and NMEA 2000 provide electrical and data specifications for a marine data network for communications between sensors, such as sensors in set of sensors 308.

In this example, set of sensors 308 sends performance inputs 310 as a real-live stream of inputs containing information pertaining to the vessel's performance. Performance inputs 310 may be transmitted to real-time performance modeler 302 using any known or available protocols for transmitting data.

Performance inputs 310 are real-time sensory inputs, such as, without limitation, wind speed, wind angle, and velocity made good. Wind speed refers to true wind speed or apparent wind speed. Wind angle refers to true wind angle or apparent wind angle.

Real-time performance modeler 302 includes measurement model 312. Measurement model 312 is a software component for processing and filtering raw performance inputs 310 data for utilization by performance model 316. Measurement model 312 receives inputs such as, without limitation, true wind angle, true wind speed, and velocity made good from set of sensors 308. True wind angle can be calculated from apparent wind angle. True wind speed can be calculated from apparent wind speed. Measurement model 312 may also be used to filter performance inputs 310.

Measurement model 312 may perform a regression analysis on one or more performance inputs 310 to create a parametric surface to the data to minimize error. Measurement model 312 may use particle filtering to choose performance points that appear to be most accurate or most correct. A performance point consists of wind speed, wind angle, boat speed, and optionally, leeway. Measurements incorporated into the performance point may be corrected so all three values reflect the same time. Measurement predication/correction may be done as part of the filtering stage, such as by using the time update equation from an Extended Kalman Filter. For example, a performance point may be data for wind speed and wind direction at a given point in time, a velocity made good, or a velocity approaching a waypoint. Several performance points spanning a given range of times may then be used to plot real-time performance trends for vessel 300.

Performance model generator 314 creates performance model 316 using performance points. Performance model 316 is a statistical or mathematical model of a vessel's performance. The performance points can be used to create or update any one of a number of types of performance models, such as, without limitation, Gaussian filters, non-parametric filters, models created through regression analysis, fitting a parametric surface to a subset of performance points, or through the application of estimators/estimation theory.

Performance model 316 is a table, matrix, or collection of data associated with a vessel's performance. In this example, performance model 316 is a table that includes the true wind velocity (TWV), true wind angle (TWA), apparent wind velocity (VAW), apparent wind angle (AWA), boat speed (V), and velocity made good toward the wind (VMG) values for vessel.

Performance model 316 is generated by performance model generator 314 based on performance inputs 310 received as real-time sensory inputs. Performance model 316 is created in a real-time manner based on the real live stream of inputs containing information pertaining to the vessel's performance during a voyage.

Performance model 316 may be mathematically deduced using known or available methods for generating performance models either by processing a batch of performance data measurement samples or by processing a performance data measurement sample one at a time, where each individual sample is used to update performance model 316. Processing a batch of samples may be done by using, without limitation, a least-mean-squares method, an LU decomposition matrix, or a Wiener filter. Processing a performance data measurement one at a time to update performance model 316 to form updated performance model 322 using, without limitation, a Kalman filter or a particle filter. Thus, performance model 316 may be a mathematical model or a statistical model in nature. The mathematical and statistical models may be any known or available mathematical or statistical models for generating performance models, such as, without limitation, parametric mathematical models or non-parametric mathematical models.

Performance model 316 may also take into account other performance aspects, such as, but not limited to, rate of acceleration/deceleration related to the mass of the vessel. Performance model 316 generates performance prediction 318 based on inputs regarding the vessel's performance and/or weather data. Performance model 316 receives values for inputs from measurement model 312 and/or vessel performance prediction requester. The inputs may include one or more inputs such as, without limitation, true wind velocity, true wind angle, apparent wind velocity, apparent wind angle, speed over ground, heading, course over ground (COG), and/or any other additional inputs regarding vessel performance. If a more comprehensive version of performance model 316 is desired, additional inputs regarding vessel performance may be provided.

For example, performance model 316 may receive input from vessel performance prediction requester 306 which may be a weather router or a polar diagram renderer. In such a case, the weather router or polar diagram renderer requesting performance prediction 318 may provide the true wind angle and/or true wind speed to performance model 316.

Performance prediction 318 is the output of performance model 316. Performance prediction 318 is a prediction associated with the vessel's performance. Performance prediction 318 may include, without limitation, a prediction for velocity made good (VMG), speed through water (STW), course over ground (COG), course made good (CMG), and heel based on the inputs of true wind velocity, apparent wind velocity, apparent wind angle, true wind angle, heading, and/or any other inputs regarding vessel performance. In one example, performance prediction 318 is a predicted value for velocity made good. In another example, performance prediction 318 includes predicted values for velocity made good over a range of true wind speeds and true wind angles.

Performance model update 320 updates performance model 316 based on performance inputs 310 received as real-time sensory inputs to form updated performance model 322. Updated performance model 322 is an updated version of performance model 316 created using real-time, streaming data regarding the particular vessels performance and changing weather conditions. Updated performance model 322 provides performance prediction 318 that reflects the changing performance of the particular vessel in real-time rather than performance model 316. Performance model 316 may be updated with dynamical, real-time input data to form updated performance model 322 only once during a particular voyage. In this example, updated performance model 322 is not updated.

In another embodiment, after creation of updated performance model 322, updated performance model 322 is updated one or more additional times using real-time inputs during the course of a voyage. In other words, based on continuous inputs, performance model 316 is continuously updated. Updated performance model 322 is able to provide real-time performance predictions.

In one embodiment, performance model 316 is updated with every created or identified performance point. In another embodiment, performance model 316 is updated with a set of performance points on a periodic basis, such as based on a timer. Performance model 316 may also be updated with a set of performance points on a non-periodic basis, such as based on user demand or system demand. In this example, performance model 316 is updated in response to a user selection of an option to update performance model 316 based on real-time performance data.

Thus, in accordance with this illustrative embodiment, real-time performance modeler 302 generates performance model 316 and/or updates performance model 316 to form updated performance model 322 using performance inputs 310 received from set of sensors 308. Performance model 316 or updated performance model 322 generates performance prediction 318 based on a subset of performance inputs 310 to predict vessel performance and/or use such predictions for simulation purposes. For example, performance predictions may be used for simulation purposes to perform weather routing during a race. These updates permit a user to obtain real-time dynamic performance predictions that take into account changing weight/mass of the vessel, changes in vessel equipment, and any other changes in vessel performance due to real-time events and current condition of the vessel. The real-time performance model then generates a real-time sailing polar as output. The real-time sailing polar provides the predicted velocity made good values and any other predicted performance data generated based on the real-time performance input.

In this example, performance model 316 is the initial performance model. This initial performance model is created automatically by performance monitor generator 314 using real-time performance inputs 310. However, in another embodiment, performance model 316 is constructed from a theoretical model of vessel performance, performance data manually entered by a user, synthesized from performance samples, and/or derived from other forms of empirical analysis about performance of vessel 300.

In this example, performance model 316 and updated performance model 322 are depicted as separate components. However, in another embodiment, performance model 316 becomes updated performance model 322 when performance model 316 is updated with real-time performance inputs.

Figure 6:
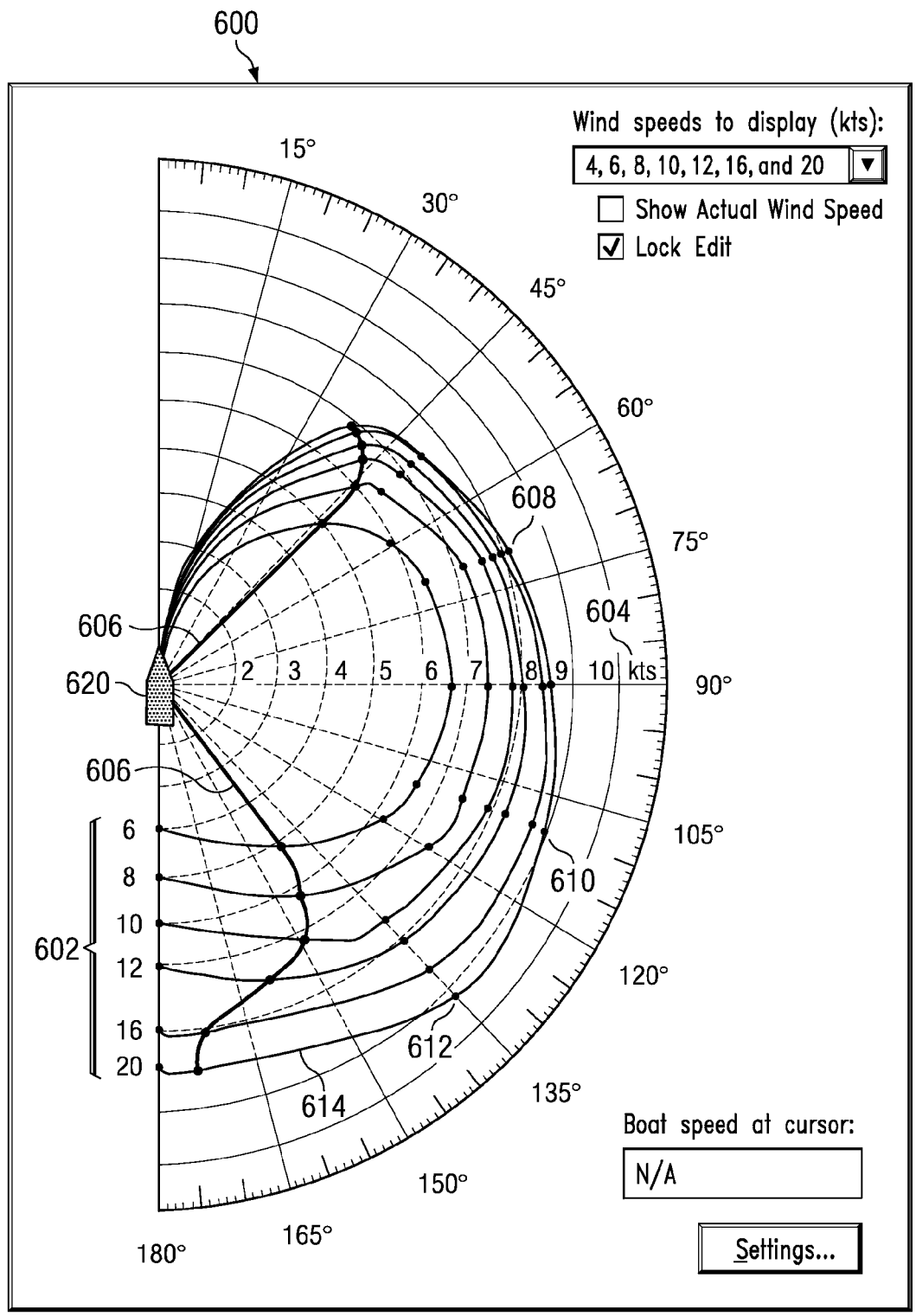
FIG. 6 is a block diagram illustrating an exemplary real-time polar in accordance with an advantageous embodiment.

In one embodiment, a sailing polar generator (not shown) makes several queries to performance model 316 or updated performance model 322 for performance prediction 318. The sailing polar generator utilizes the performance prediction 318 to determine a set of performance points needed to construct a sailing polar and export the information in the required format. Alternatively, the sailing polar generator may directly convert performance model 316 or updated performance model 322 by other means to a sailing polar. The sailing polar may be generated for printout or storage to a file for sharing. An exemplary sailing polar is shown in FIG. 6 below.

Existing sailing polar renderers (not shown) use sailing polars as their source data. In one embodiment, a sailing polar renderer makes several performance prediction queries to performance model 316 or updated performance model 322. The sailing polar renderer constructs a polar diagram based on performance points received from performance model 316 or updated performance model 322. In another embodiment the sailing polar renderer processes performance model 316 or updated performance model 322 into iso-speed contours and renders those iso-speed contours to a polar diagram.

In one exemplary embodiment, an estimated time of arrival (ETA) calculator/computer (not shown) makes a prediction as to a time for a vessel to traverse a route based on performance prediction 318 in response to a user query. The ETA calculator makes several queries regarding prevailing conditions, such as, without limitation, tidal currents speed, wind speed, wind direction. The ETA calculator also queries performance model 316 or updated performance model 322 for performance prediction 318 along the whole of a route and/or the remainder of a route. The ETA calculator calculates the amount of time to traverse any part or all of a route given a starting time from those predictions of conditions. The starting time may be a time in the future or the current time.

In another example, a shortest path component (not shown) uses a shortest path algorithm to perform shortest path calculations based on performance prediction 318. A shortest path component is a software algorithm that calculates the cost of traversing between locations and chooses the sequence of locations constituting a path of minimal cost, ensuring the path meets other specified criteria, such as severe weather avoidance and/or maximum wave height. A shortest path component may be a weather router. The shortest path component queries performance model 316 or updated performance model 322 to get performance prediction 318 based on reported/forecast weather conditions as part of the path cost calculations. Using performance prediction 318, possibly in conjunction with other calculations, the cost to traverse a section of a path may be determined by the shortest path component. The user may query the shortest path component for the shortest path prediction.

Figure 4:
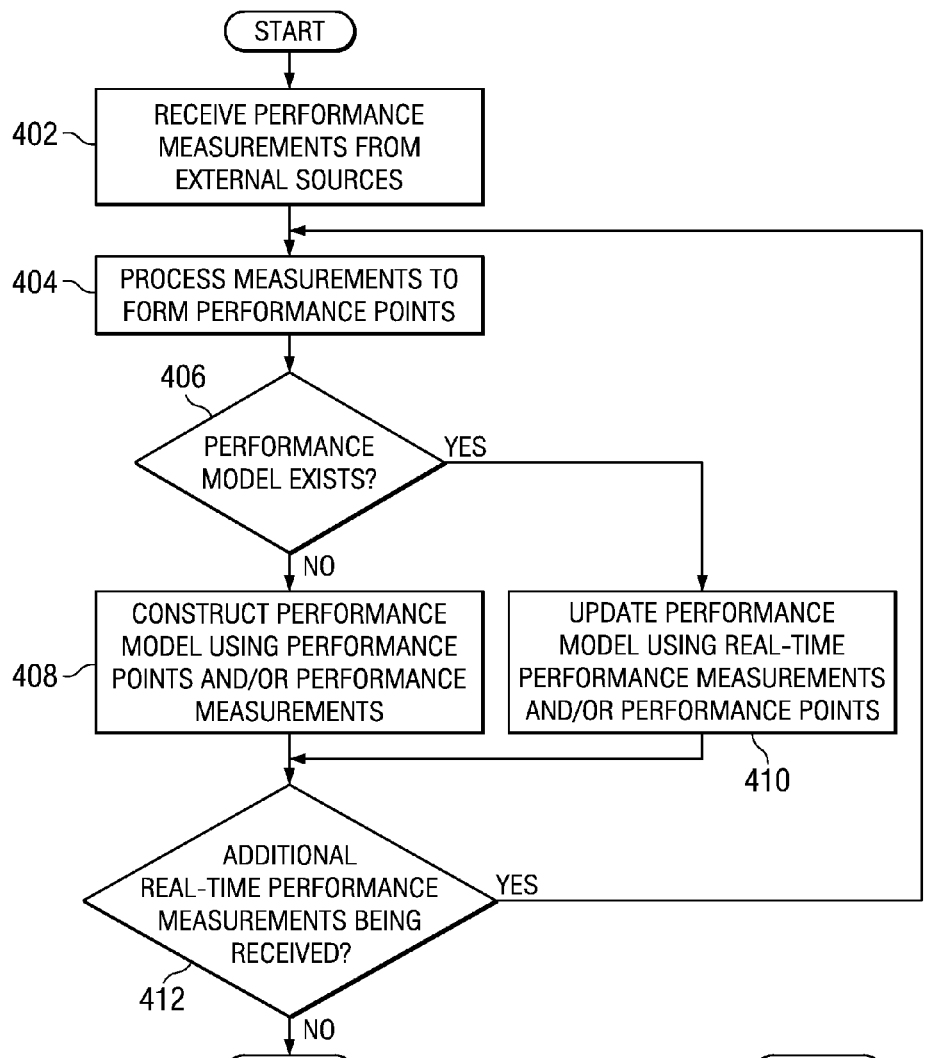
FIG. 4 is a flowchart illustrating a process for generating and/or updating a performance model in accordance with an advantageous embodiment.

Turning now to FIG. 4, a flowchart illustrating a process for generating and/or updating a performance model is shown in accordance with an advantageous embodiment. The process may be implemented by a software component for generating and/or updating real-time performance models, such as real-time performance modeler 302 in FIG. 3.

The performance modeler begins by receiving performance measurements from external sources (operation 402). The external sources are sensors for measuring a vessel's performance, such as set of sensors 308 in FIG. 3. Thus, a stream of measurements comes into the system from external sources such as NMEA devices. Information includes boat speed, wind speed, wind direction, and optionally leeway. The measurements may also be inferred by other means. For example, true wind speed can be inferred from apparent wind speed. The measurements may also be filtered to reduce measurement error and/or the severity of spurious data. For example, filtering can be used to reduce the impact a gust of wind has on the data. Input errors and measurement concurrency issues can be reduced by using instrumentation with rapid sampling rates The performance modeler processes performance measurements to form performance points (operation 404). A performance point is performance data that has been processed, filtered, and/or combined with other performance measurements to form the performance point. A performance point consists of wind speed, wind angle, boat speed, and optionally, leeway. Measurements incorporated into the performance point may be corrected so all three values reflect the same time. Measurement prediction/correction may be done as part of the filtering stage, such as by using the time update equation from an extended Kalman filter.

The performance modeler makes a determination as to whether a performance model already exists (operation 406). The pre-existing performance model may be a static performance model that was purchased by a user, manually generated by a user, or a dynamic performance model generated by the performance modeler at an earlier time. A performance model may be created manually by a user entering performance values directly into a spreadsheet or other performance model.

If a performance model does not already exist, the performance modeler automatically constructs a performance model using performance points and/or any other appropriate performance measurement data (operation 408). The performance points can be used to create or update any one of a number of types of performance models.

Returning to operation 406, if a performance model already exists, the performance modeler updates the performance model using the performance points (operation 410). The performance modeler makes a determination as to whether additional real-time performance measurements are being received (operation 412). If additional real-time performance measurements are being received, the performance modeler returns to operation 404 and continues processing input data to update the performance model automatically and dynamically during real-time. When additional real-time performance measurement data is no longer being received at operation 412, the process terminates thereafter. Thus, a performance model may be created using incoming real-time performance data without the need for offline processing or manual user intervention.

The performance prediction results generated by the performance modeler may be used for various tasks and presented to the user in various different forms. For example, the real-time performance prediction data may be used to generate a polar diagram, such as the polar diagram shown in FIG. 6 below. The real-time performance prediction may also be used to calculate a shortest route or an estimated time to arrive at a destination given current conditions and future predicted conditions.

Figure 5:
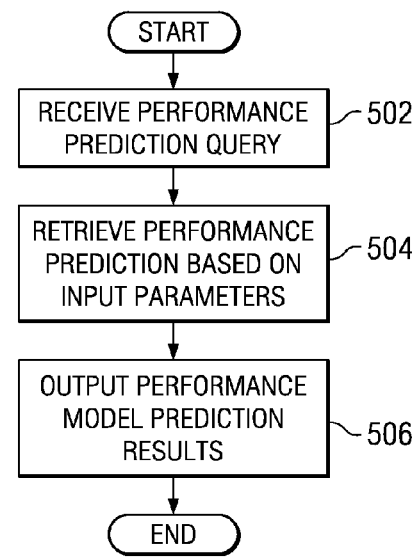
FIG. 5 is a flowchart illustrating a process for generating a real-time performance prediction in accordance with an advantageous embodiment.

FIG. 5 is a flowchart illustrating a process for generating a real-time performance prediction in accordance with an advantageous embodiment. The process may be implemented by a software component for generating real-time performance models, such as real-time performance modeler 302 in FIG. 3.

The performance modeler begins by receiving a real-time performance prediction query (operation 502) from a vessel performance prediction requester, such as vessel performance prediction requestor 306 in FIG. 3. The performance modeler retrieves a performance prediction from a real-time performance model based on the input parameters in the performance prediction query and the performance inputs (operation 504). In other words, after a performance model is constructed, the performance model can be queried for performance predictions. The performance query may include parameters, such as wind speed and wind angle. The performance modeler retrieves a performance prediction based on the input parameters. The performance model prediction output may be vessel speed (VMG) and, optionally, leeway. The performance modeler then outputs the performance model prediction results (operation 506) with the process terminating thereafter.

Sailing polars are usually plotted as mathematical polar diagrams with several "polar lines." Polar lines visually indicate the relationship between true wind angle (TWA), true wind speed (TWS), and velocity made good (VMG). An exemplary sailing polar diagram is illustrated in FIG. 6 below.

Referring to FIG. 6, a block diagram illustrating an exemplary real-time polar is shown in accordance with an advantageous embodiment. Polar 600 is an example of a sailing polar diagram created by a performance model using streaming or real-time vessel performance data. Polar 600 is plotted as a mathematical polar diagram having polar display graticule. Set of numbers 602 indicate wind speeds. The numbers in degrees along the outer perimeter of the diagram indicates wind angle relative to a vessel's bow. The numbers along a horizontal line at 604 indicate vessel speeds in knots.

Polar lines 608 connect optimal upwind and downwind performance points together. Polar lines 604 are interpolated from performance points, such as performance points 608-612. The performance points on polar 600 that have identical wind speeds together, such as performance points 608-612, are connected by polar lines, such as polar line 614. Icon 620 represents the particular vessel for which polar 600 is being used to make performance predictions, with the bow of the vessel pointing up.

The illustrative embodiments provide a computer implemented method, apparatus, and computer usable program code for real-time creation of vessel performance models. In one embodiment, the process performance inputs are received from a set of sensors during a voyage of a vessel. The performance inputs are data associated with a performance of the vessel during the voyage. A real-time performance model is generated during the voyage using a subset of the performance inputs. A predicted value for velocity made good is identified for the vessel using the real-time performance model.

The illustrative embodiments create polars specific to a particular vessel in a real-time fashion. As the particular vessel is sailing or traveling on a voyage, weather condition parameters and vessel performance parameters are taken and used to create polars for that particular vessel. Pre-created performance models are not necessary. If polars are already available, the pre-created polars can be updated using real-time performance data for the particular vessel to improve the accuracy of the performance predictions generated by the polars because the polars will be generated or updated based on the current, real-time performance of that particular vessel rather than basing the polars on expected performance for a vessel similar to the particular vessel. Thus, the illustrative embodiments allow a user to create and/or update a performance model for a particular vessel based on real-time sensory inputs, such as wind speed, wind angle, and velocity made good, for that particular vessel.

One advantage realized by one or more of the illustrative embodiments is that a user is able to utilize the real-time polars to gain usable, current information about how the vessel behaves in a range of conditions rather than off-line methods whose predictions may become increasingly out of date over the course of one or more voyages due to wear and tear on the vessel and changes in mass as fuel and vessel stores are utilized. These up-to-date models are useful for planning.

Moreover, the automated, real-time creation of sailing polars in accordance with the illustrative embodiments could reduce or eliminate the cost of providing and preparing off-line pre-predicted performance models. Because real-time polars can be generated automatically without user intervention, the time and expense of manually creating polars can be avoided. Finally, real-time polars are able to account for real-time changes in a vessel's actual performance. This enables a user to compensate for predicted future performance of a particular vessel given the current real-time performance changes of the particular vessel.

The flowchart and block diagrams in the figures illustrate the architecture, functionality, and operation of possible implementations of systems, methods and computer program products according to various embodiments. In this regard, each operation in the flowchart or block diagram may represent a module, segment, or portion of code, which comprises one or more executable instructions for implementing the specified logical function(s). It should also be noted that, in some alternative implementations, the functions noted in the operation may occur out of the order noted in the figures. For example, two operations shown in succession may, in fact, be executed substantially concurrently, or the operations may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W), or DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for real-time creation of sailing vessel performance models, the computer implemented method comprising:
receiving first performance inputs from a set of sensors during a voyage of a vessel, wherein first performance inputs are data associated with a performance of the vessel during the voyage at a first time, the set of sensors including onboard sensors and offboard sensors including a buoy-positioned sensor;
responsive to receiving a request from a requestor module, generating, by a processor, during the voyage, a real-time performance model based on the first performance inputs, the performance model being a mathematical or statistical digital model, wherein generating a real-time performance model further comprises:
identifying one or more sets of performance inputs, the performance inputs comprising wind speed, wind angle, and velocity made good;
filtering the one or more sets of performance inputs to form one or more performance points, wherein each set of performance inputs forming the one or more performance points is for a certain point of time; and
generating a table using a subset of the one or more performance points so as to create the table of the subset of the one or more performance points;
generating based on the table of the subset of the one or more performance points, by the processor, a first performance prediction for the vessel, the performance prediction including a predicted value for velocity made good for the vessel using the real-time performance model;
receiving a second set of performance inputs from the set of sensors at a second time after a change in performance by the vessel, the second set of performance input including a changed mass for the sailing vessel based on fuel consumption;
updating the first performance model using the second set of performance inputs to determine a subset of one or more performance points to form an updated digital performance model, the updating comprising repeated updating over an interval of time;
generating an updated performance prediction based on the updated model, the updated performance prediction reflecting the change in performance by the vessel;
determining a set of performance points needed to construct a polar diagram and output the polar diagram in a required format using the updated performance prediction; and
generating the polar diagram using the real-time updated performance model generated and the predicted value for velocity made good identified, wherein the polar diagram comprises polar display graticule including polar lines interpolated from the one or more performance points of the real-time performance model.

2. The computer implemented method of claim 1 wherein the set of performance inputs from the set of sensors includes at least one of a true wind angle, a true wind speed, an apparent wind angle, an apparent wind speed, a current heading, and a current course.

3. The computer implemented method of claim 1 further comprising:
generating a sailing polar using the real-time performance model; and
performing a simulation using the real-time performance model.

4. The computer implemented method of claim 1 further comprising:
identifying a time to traverse a route using the real-time performance model using a query that includes at least tidal current speed, wind speed, and wind direction.

5. The computer implemented method of claim 1 further comprising:

identifying a shortest route for the vessel to reach a destination using the real-time performance model.

6. The computer implemented method of claim 1 further comprising:
gauging a performance of the vessel using the real-time performance model.

7. The computer implemented method of claim 1 further comprising:
using at least the first performance model and a second performance model that is different from the first performance model to determine changes in the performance of the vessel over time.

8. The computer implemented method of claim 1 further comprising:
generating a merged performance model for a class of vessel associated with the vessel using multiple real-time performance models for the class of vessel.

9. The computer implemented method of claim 1 wherein generating the real-time performance model further comprises:
processing a batch of performance sample measurements data received from the set of sensors to generate the real-time performance model, wherein the batch of performance sample measurements are processed using a method selected from a group consisting of least-mean-squares method, LU decomposition method, and Wiener filter method.

10. The computer implemented method of claim 1 wherein generating the real-time performance model further comprises:
processing a sample of performance measurement data to update the performance model to form an updated performance model, wherein the sample is processed using a Kalman filtering method or a particle filtering method.

11. The computer implemented method of claim 1 wherein generating the polar diagram using the real-time performance model generated and the predicted value for velocity made good identified further comprises:
outputting the polar diagram in a required format for display on a sailing polar renderer.

12. The computer implemented method of claim 1 further comprising predicting for the vessel at least one of speed through water, course over ground, course made good, and heel, the predicting using the performance model.

13. The computer implemented method of claim 1 further comprising predicting a velocity made good for the vessel using the performance model.

14. The computer implemented method of claim 1 wherein repeated updating comprises updating on a periodic time basis.

15. The computer implemented method of claim 1, wherein repeated updating comprises updating based on a user demand.

16. The computer implemented method of claim 1, wherein repeated updating comprises updating upon creation of a performance point.

* * * * *